(12) United States Patent
Sugata et al.

(10) Patent No.: US 6,551,038 B1
(45) Date of Patent: Apr. 22, 2003

(54) MACHINE TOOL AND COVER DEVICE FOR THE MACHINE TOOL

(75) Inventors: Shinsuke Sugata, Fukuyama (JP); Yoshihide Seo, Hiroshima-ken (JP)

(73) Assignee: Horkos Corp., Hiroshima-ken (JP)

( * ) Notice: Subject to any disclaimer, the term of this patent is extended or adjusted under 35 U.S.C. 154(b) by 0 days.

(21) Appl. No.: 10/019,952

(22) PCT Filed: Jul. 6, 2000

(86) PCT No.: PCT/JP00/04564
§ 371 (c)(1),
(2), (4) Date: Jan. 7, 2002

(87) PCT Pub. No.: WO01/03883
PCT Pub. Date: Jan. 18, 2001

(30) Foreign Application Priority Data

Jul. 12, 1999 (JP) ............................................. 11-197583

(51) Int. Cl.⁷ ............................. B23C 9/00; B23Q 11/08
(52) U.S. Cl. ....................... 409/134; 409/235; 409/191; 29/DIG. 56; 29/DIG. 59; 74/613; 408/234
(58) Field of Search ................................ 409/134, 235, 409/191; 29/DIG. 53, DIG. 56, DIG. 59, DIG. 60, DIG. 86, DIG. 94; 451/451, 455; 74/608, 612–613; 408/234, 241 G (56) References Cited

U.S. PATENT DOCUMENTS

| | | | | |
|---|---|---|---|---|
| 5,482,414 A | * | 1/1996 | Hayashi et al. | 409/134 |
| 5,662,568 A | * | 9/1997 | Linderm | 409/235 |
| 5,871,312 A | * | 2/1999 | Haninger et al. | 409/134 |
| 6,012,884 A | * | 1/2000 | Azema | 409/191 |
| 6,120,222 A | * | 9/2000 | Hiramoto et al. | 409/134 |
| 6,120,223 A | * | 9/2000 | Hirose et al. | 409/134 |

FOREIGN PATENT DOCUMENTS

| | | | |
|---|---|---|---|
| JP | 4-365529 | | 12/1992 |
| JP | 3467/1993 | | 8/1994 |
| JP | 8-25161 | | 1/1996 |
| JP | 8-25170 | | 1/1996 |
| JP | 10-138085 A | * | 5/1998 |
| JP | 2000-176783 A | * | 6/2000 |
| WO | WO-97/22832 A1 | * | 6/1997 |
| WO | WO-01/85390 A1 | * | 11/2001 |

* cited by examiner

Primary Examiner—A. L. Wellington
Assistant Examiner—Erica E Cadugan
(74) Attorney, Agent, or Firm—Venable, LLP; John P. Shannon (57) ABSTRACT

A machine tool and a cover device for the machine tool capable of preventing work cutting chips and coolant from falling on the rear part of a spindle head (8) and the operating positions of a first saddle (4) and a second saddle (6) without expanding the lateral width of the machine tool, wherein a column (2) is fixedly installed on a bed (1), the first saddle (4) is guided on the front surface of the column (2) movably in vertical direction (f1), the second saddle (6) is guided on the front surface of the first saddle (4) movably in lateral direction (f2), and the spindle device (8) is guided on the second saddle (6) movably in longitudinal direction (f3) and, in addition, a first cover plate (31) is fixed to the second saddle (6), a side cover plate (33) is installed continuously with each of the right and left side edges of the cover plate (31) bendably in longitudinal direction (f3), a second cover plate (39) is fixed integrally with the first saddle (4), and a third cover plate (41) is installed fixedly to the front side of the second cover plate (39).

5 Claims, 12 Drawing Sheets

MACHINE TOOL AND COVER DEVICE FOR THE MACHINE TOOL

FIELD OF THE INVENTION

The present invention relates to a machine tool having a specific cover device.

BACKGROUND OF THE INVENTION

Japanese patent publication No. 365529 of 1992 discloses a machine tool capable of shortening the length of a spindle direction (namely, longitudinal direction) of the first saddle, the second saddle, and a column, and of moving a spindle head in longitudinal direction at high speed. As shown therein, the machine tool is defined that the column is fixedly installed on a bed in the spindle direction and guides the first saddle to move in vertical direction. Besides, the first saddle guides the second saddle to move in lateral direction, and the second saddle guides the spindle head to move in longitudinal direction.

In the above machine tool, when a tool installed on the front end of the spindle head cuts a workpiece, cutting chips and coolant sometimes splash backward due to rotations of the tool. Without any protection from this splash, cutting chips of the workpiece and tile coolant fall directly on the first saddle and the second saddle. As a result, not only machining accuracy is damaged, but also maintenance and cleaning of the machine tool are made difficult.

An object of the invention is to provide a machine tool having a specific cover device free from the above problems.

SUMMARY OF THE INVENTION

To achieve the above object, a machine tool of this invention has the following characters. A column is fixedly installed on a bed, and the first saddle is guided on the front surface of the column movably in vertical direction. The second saddle is guided on the front surface of the first saddle movably in lateral direction, and tile spindle head is guided on the second saddle movably in longitudinal direction. To the front surface of the second saddle is fixed the first cover plate which allows the spindle head to move in longitudinal direction. A side cover plate is connected to each of the right and left side edges of the cover plate in such a manner that the side cover plate can bend backward due to guiding effect of a guiding means provided between the side cover plate and the first saddle. The second cover plate covers the front side, tie upper side and the lower side of tile first cover plate in such a manner that the spindle head can move in lateral direction. The second cover plate is fixed integrally with the first saddle, and the third cover plate is fixedly installed to the front side of the second cover body. The third cover plate covers the front surface of the column in such a manner that the spindle head can move in vertical and lateral directions.

The above first cover plate, side cover plate, second cover plate and third cover plate can prevent cutting chips and coolant which splash from the tip of the spindle head from falling directly on the rear part of the spindle head, the first saddle and the second saddle.

Besides, when the second saddle moves in lateral direction, the right and left side cover plates are prevented from bending backward and from protruding in lateral direction.

More concretely, the first cover plate has a through hole into which the spindle head is inserted movably in longitudinal direction. A sealing means is provided between the through hole and tile spindle head, thereby keeping an interval therebetween almost liquid-tightly. With this structure, cutting chips and coolant splashing backward from the tip end of the spindle head are prevented from getting in the back of the spindle head through the interval between the through hole and the spindle head.

Circular guide passages are provided to the guiding means provided between tile side cover plate and the first saddle.

Moreover, when the second saddle moves to either of the right and left sides, the side cover plate on the side to which the first saddle moves bends backward centering on a position connecting with the first cover plate due to guiding effects of circular guide passages of the guiding means.

Besides, the side cover plate is pulled in a direction perpendicular to the circular guide passages of the guiding means by forcing means. This structure controls shake due to free space of an operating part of the side cover plate.

On the other side, the side cover plate may be formed from plural cover plate members, and these cover plate members are bendably connected with each end.

BRIEF DESCRIPTION OF THE DRAWINGS

FIG. 5A is a perspective view of the first saddle, and

FIG. 5B is a perspective view of the second saddle.

FIG. 7A is a plan e view,

FIG. 7B is a side view, and

FIG. 7C is a sectional view taken on line x—x.

FIG. 12A is a horizontal sectional view of the second saddle when it moves to the left end of its movable range, and FIG. 12B is a horizontal sectional view of the second saddle when it moves to the right end of its movable range.

PREFERRED EMBODIMENT OF THE PRESENT INVENTION

The present invention is described with reference to figures as follows.

A machine tool of this invention is a machining center. It comprises a bed 1 forming the lowest part, a column 2 fixed on the upper surface of the bed 1, a pair of guide rails 3, 3 vertically fixed on the front surface of the column 2, the first saddle 4 guided by the guide rails 3, 3 movably in vertical direction f1, a pair of rail members 5, 5 laterally fixed on the front surface of the first saddle 4, the second saddle 6 guided by the rail members 5, 5 movably in lateral direction f2, a pair of rail members 7, 7 longitudinally fixed on the second saddle 6, and a spindle head 8 guided by the rail members 7, 7 movably in longitudinal direction f3.

Each structure of the above is explained as follows.

The bed 1 forms a box made of steel plate. Supporting members 9, 9 for fixing a not-illustrated working table are installed on the upper surface of the bed 1 in front of the column 2. A dropping hole 10 is provided at the center of the bed 1 to drop cutting chips and coolant into a specific place.

The column 2 has a pair of right and left vertical elements 2a, 2a and a pair of top and bottom lateral elements 2b, 2c. The column 2 is mainly composed of a square frame body having a relatively large square hole "a" in longitudinal direction at the center. Here, a motor table 2d is provided to the lateral element 2b on the upper side, and a servomotor 11 for driving the first saddle 4 in vertical direction is fixed on the motor table 2d.

Figure 1:
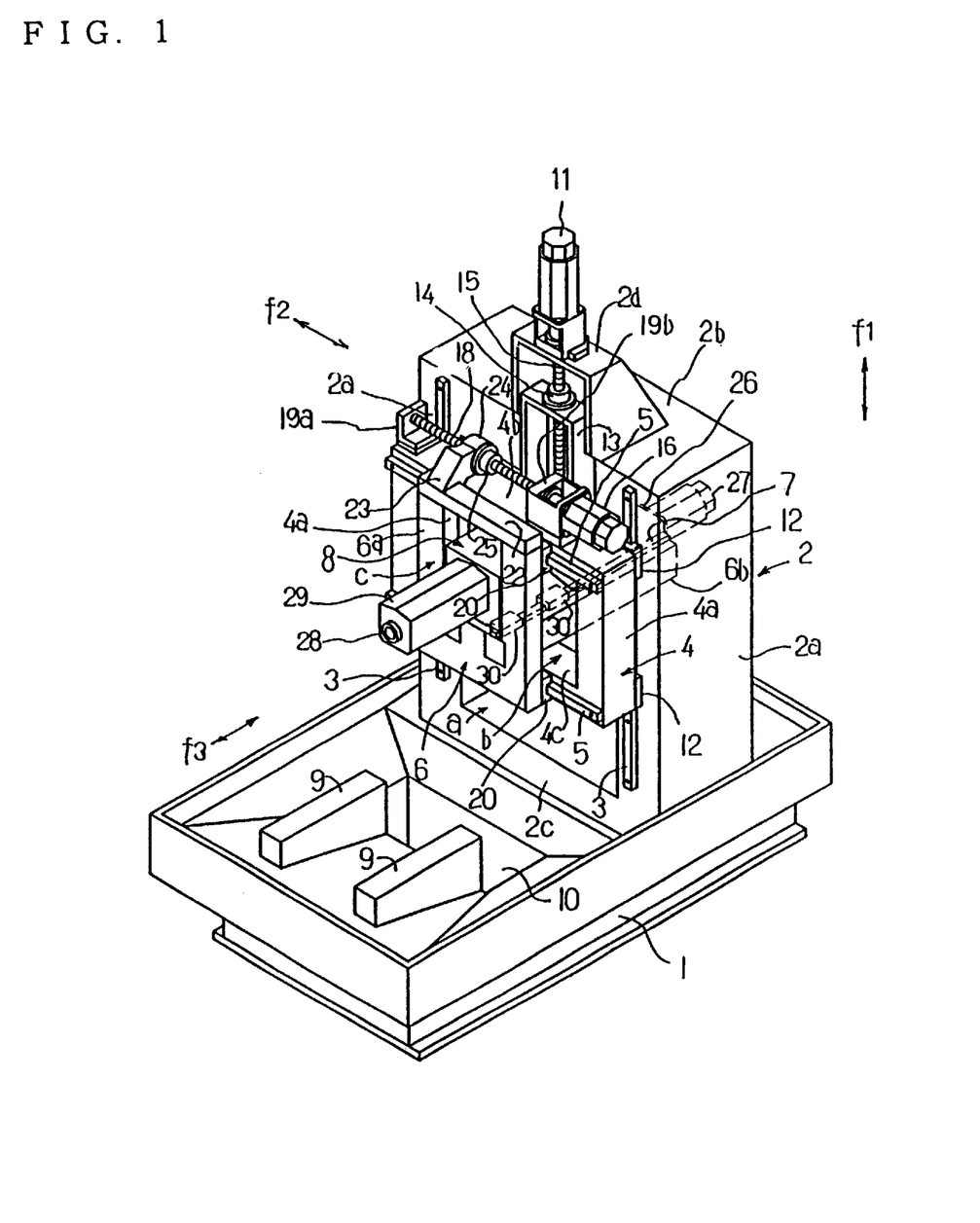
FIG. 1 is a perspective view of an embodiment showing a basic structure of a machine tool of the invention.
Figure 2:
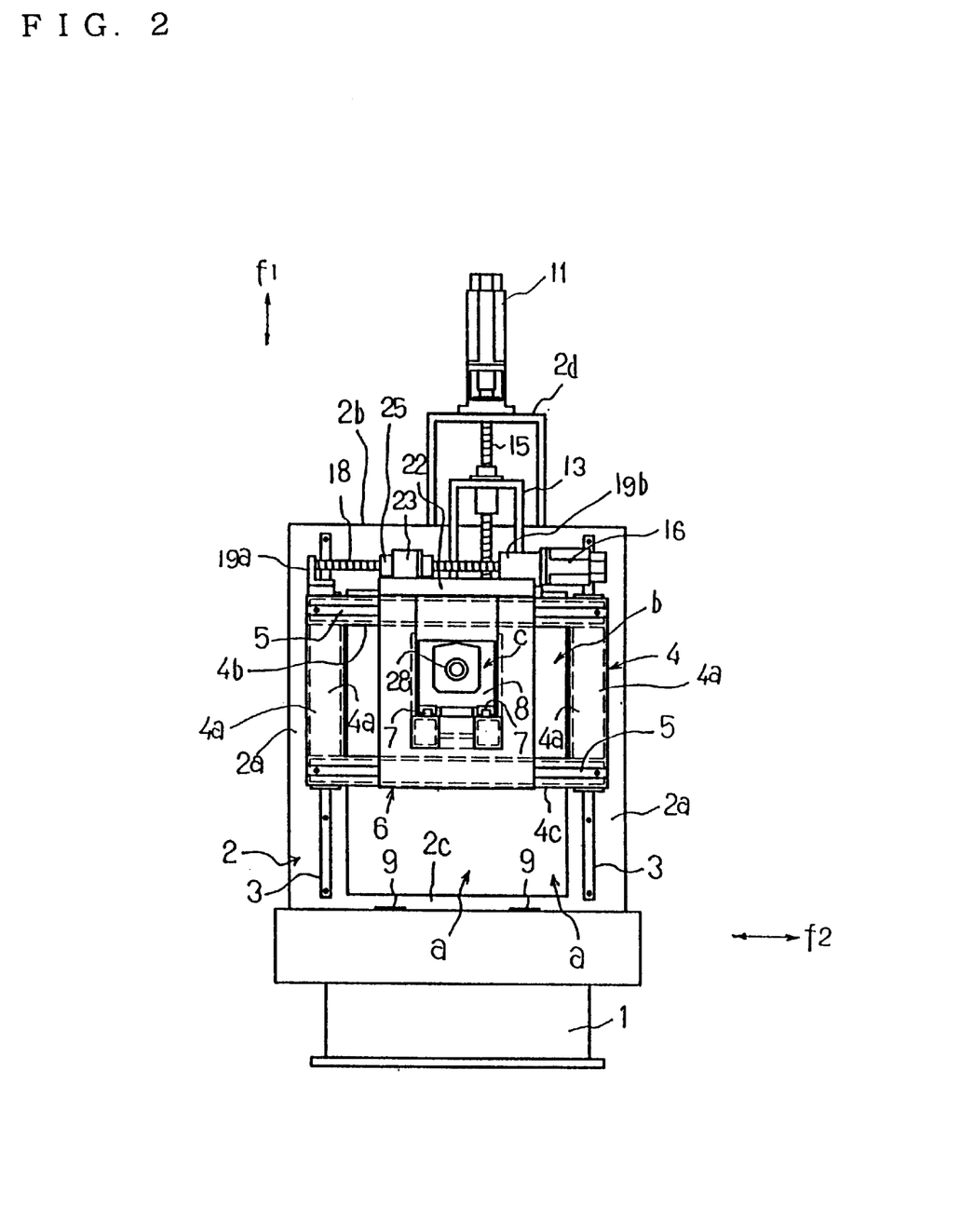
FIG. 2 is a front view of the above basic structure.
Figure 3:
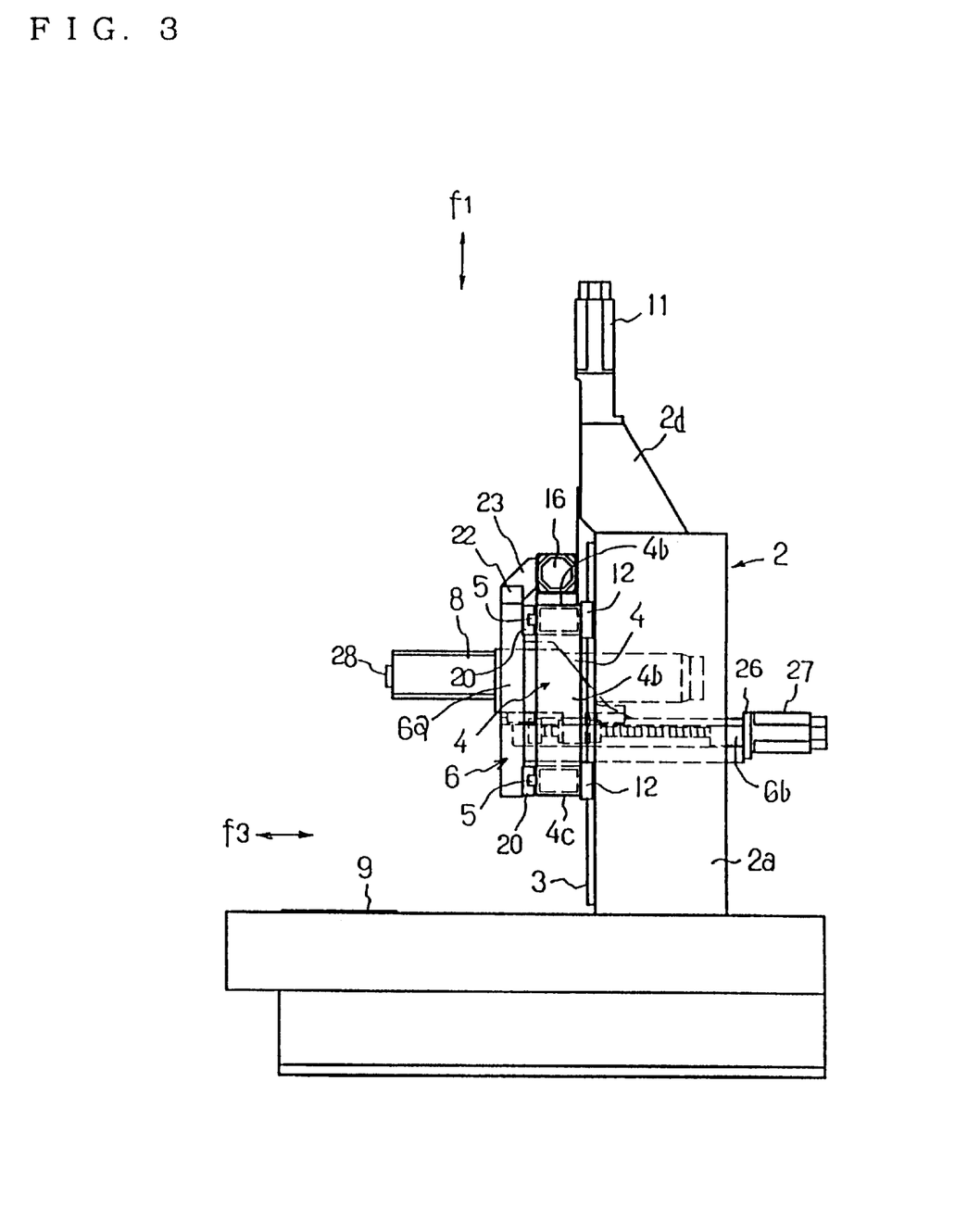
FIG. 3 is a side view of the above basic structure.
Figure 4:
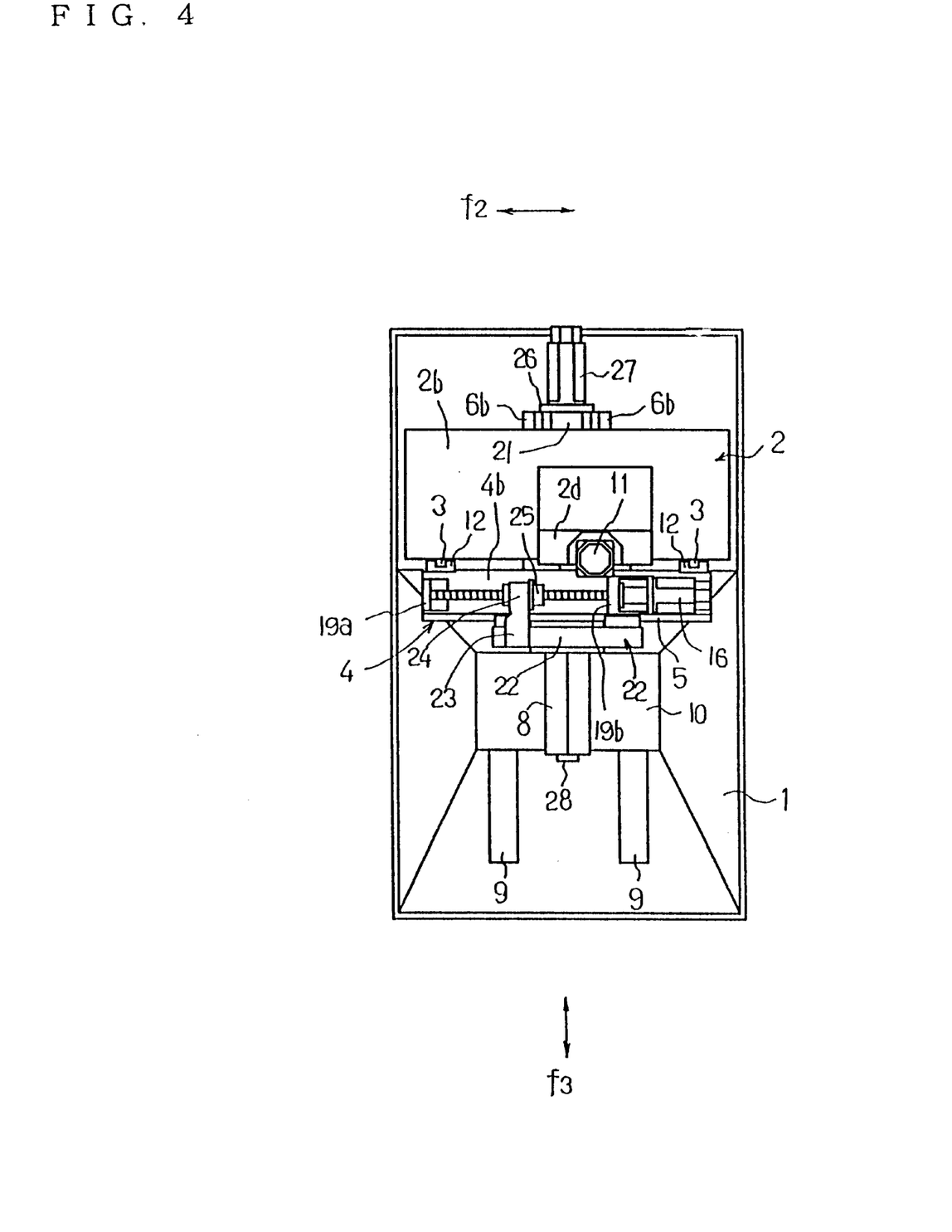
FIG. 4 is a plane view of the above basic structure.
Figure 5:
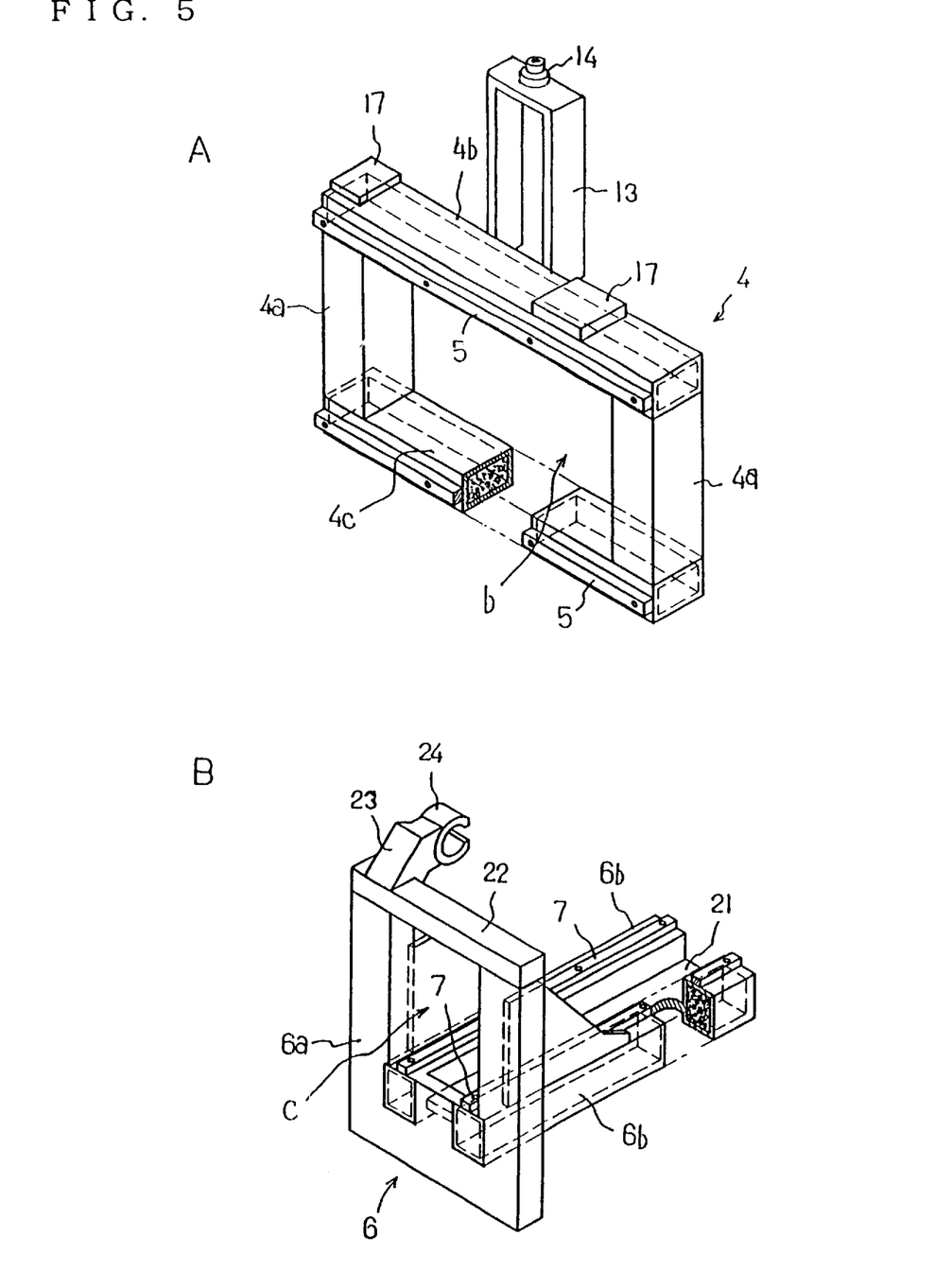
FIG. 5 shows a part of the above basic structure.

As shown in FIG. 5A, the first saddle 4 has a pair of right and left vertical single prismatic bodies 4a, 4a having square cross sections respectively, and a pair of top and bottom lateral single prismatic bodies 4b, 4c having square cross sections respectively. Here, the center of the first saddle 4 forms a relatively large square hole "b" in longitudinal direction. A vertical square frame is made of steel plates within the size of the front surface of the column 2. An fitting member 12, which is guided by the rail members 3, 3, is fixed on the rear surface of the square frame body. A pair of rail members 5, 5 for guiding the second saddle 6 are fixed on the front surface of the top avid bottom lateral prismatic bodies 4b, 4c. A bracket 13 in an inverse U-shaped from the front view is secured on the rear surface of the top lateral prismatic body 4b. A nut 14 is fixed on the top of the bracket 13. In this case, the single prismatic bodies 4a, 4b, 4c include one formed by integrating plural prismatic members having a square cross section.

A vertical screw shaft 15, which is connected to an output shaft of the servomotor 11, is screwed into the nut 14. A servomotor 16 for driving the second saddle 6 in lateral direction is installed on the upper surface of the top lateral frame member 4b. Besides, as shown in FIG. 5A, a pair of reinforcing plates 17, 17 are fixed on the upper surface of the lateral frame member 4b, and bearing members 19a, 19b which rotatively support a lateral screw shaft 18 connected to the output shaft of the servomotor 16 are fixed on the reinforcing plates 17, 17.

As shown in FIG. 5B, at the center of the second saddle 6 is provided a longitudinal square hole "c" into which the spindle head 8 is inserted. Besides, the second saddle 6 has a vertical square frame 6a within the size of the front surface of the first saddle 4. Moreover, on the rear surface of the square frame body 6a are secured a pair of right and left horizontal inductive frames 6b, 6b made of square steel cylinder members in longitudinal direction, and plural fitting members 20 guided by the rail members 5, 5.

The spindle head 8 has a head frame 29 for rotatively supporting a longitudinal spindle 28. A not-illustrated drive motor for rotating the spindle 28 is provided inside the head frame 29. On the bottom surface of the head frame 29 are provided plural interfitting members 30 guided by the rail members 20.

A bulging member 23 which projects obliquely upwardly to the back is provided on one side of the upper surface of the lateral prismatic body 22 on the upper side of the square frame 6a. At the tip end of the bulging member 23 is fixed a disengaging ring-shaped nut holding member 24. The lateral screw shaft 18 screws on a nut held by the nut holding member 24. Besides, a vertical supporting plate 26 is secured between the rear parts of the right and left horizontal inductive frames 6b, 6b, and a servomotor for driving the spindle head in a longitudinal direction is fixed on the rear surface of the supporting plate 26.

A not-illustrated screw-nut mechanism for longitudinally moving the head frame 29 by rotation of the servomotor 27 is provided between the head frame 29 and the servomotor 27.

A cover device is installed on the basic structure of thus formed machine tool. A concrete structure is explained with reference to FIG. 6 to FIG. 11.

Figure 6:
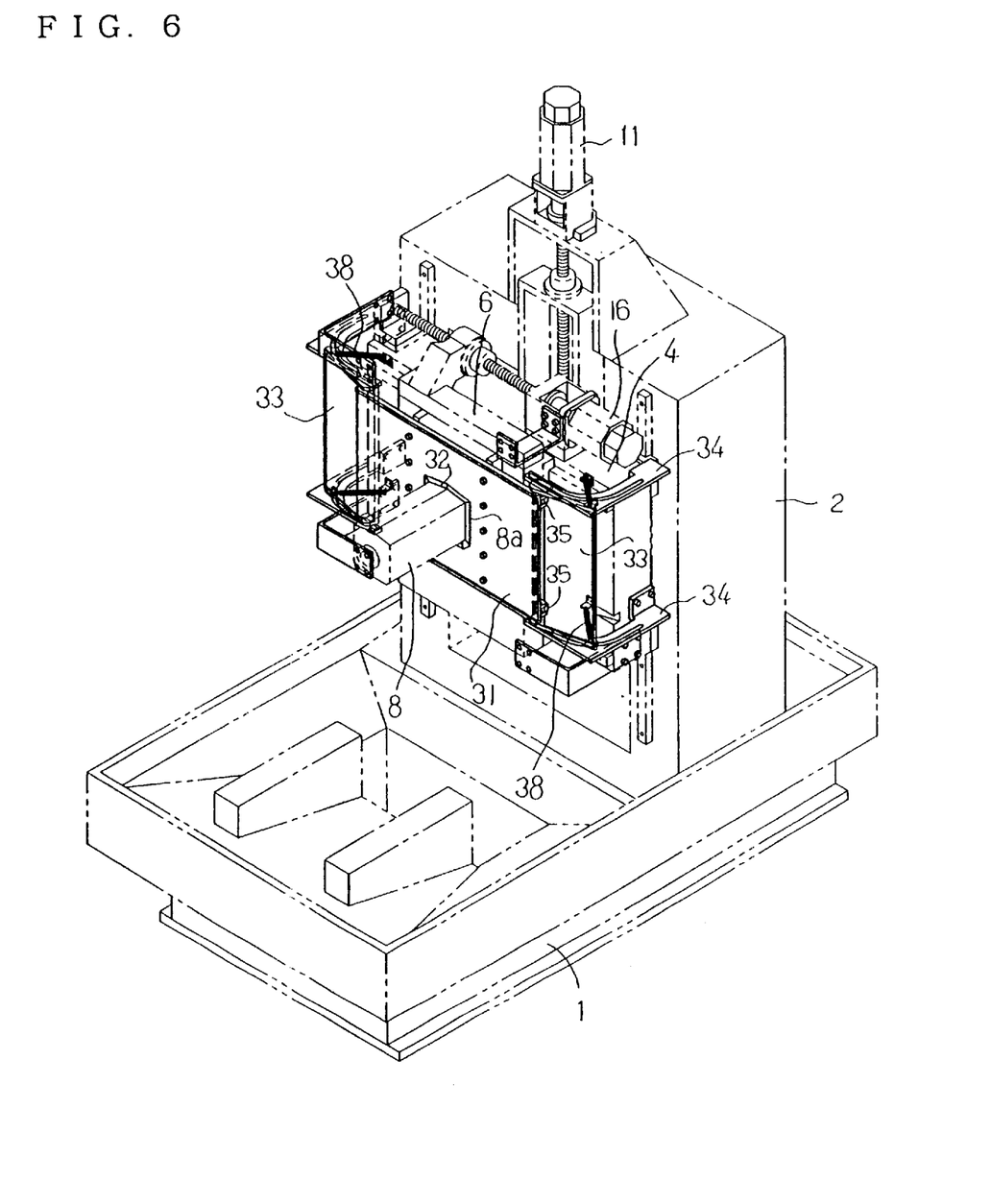
FIG. 6 is a perspective view of the above basic structure to which the first cover plate and the side cover plate are installed.

As shown in FIG. 6, the first cover plate 31 is fixed on the front surface of the second saddle 6, covering almost the whole thereof. At the center of the first cover plate 31 is provided a through hole 8a into which the spindle head 8 is inserted in longitudinal direction. At the inner circumference of the through hole 8a is fixed a sealing means 32 to seal an interval between the spindle head 8 and the through hole 8a almost liquid-tightly. For example, a flexible belt-like rubber is used as the sealing means 32.

Figure 7:
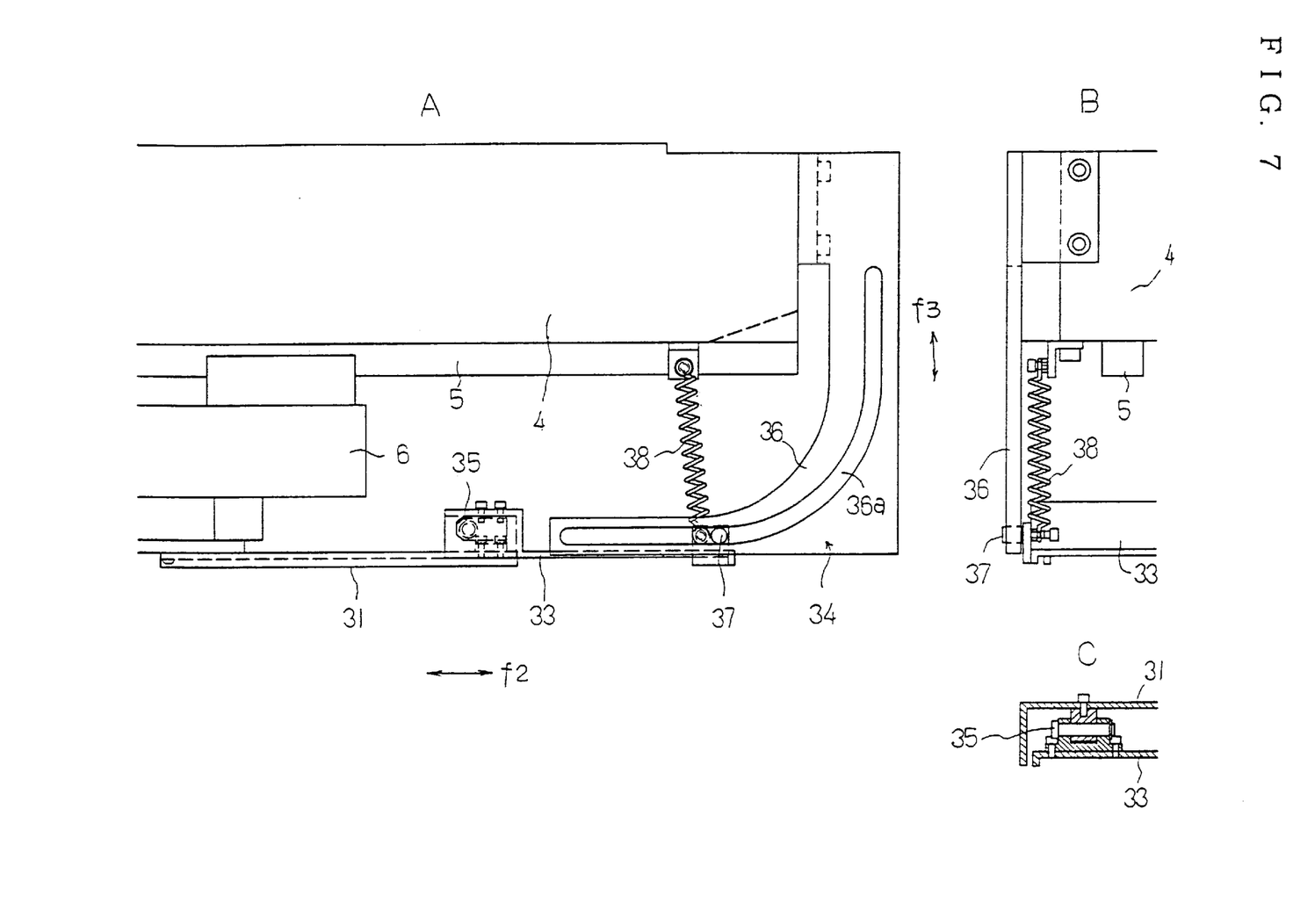
FIG. 7 shows a part of the above machine tool.
Figure 8:
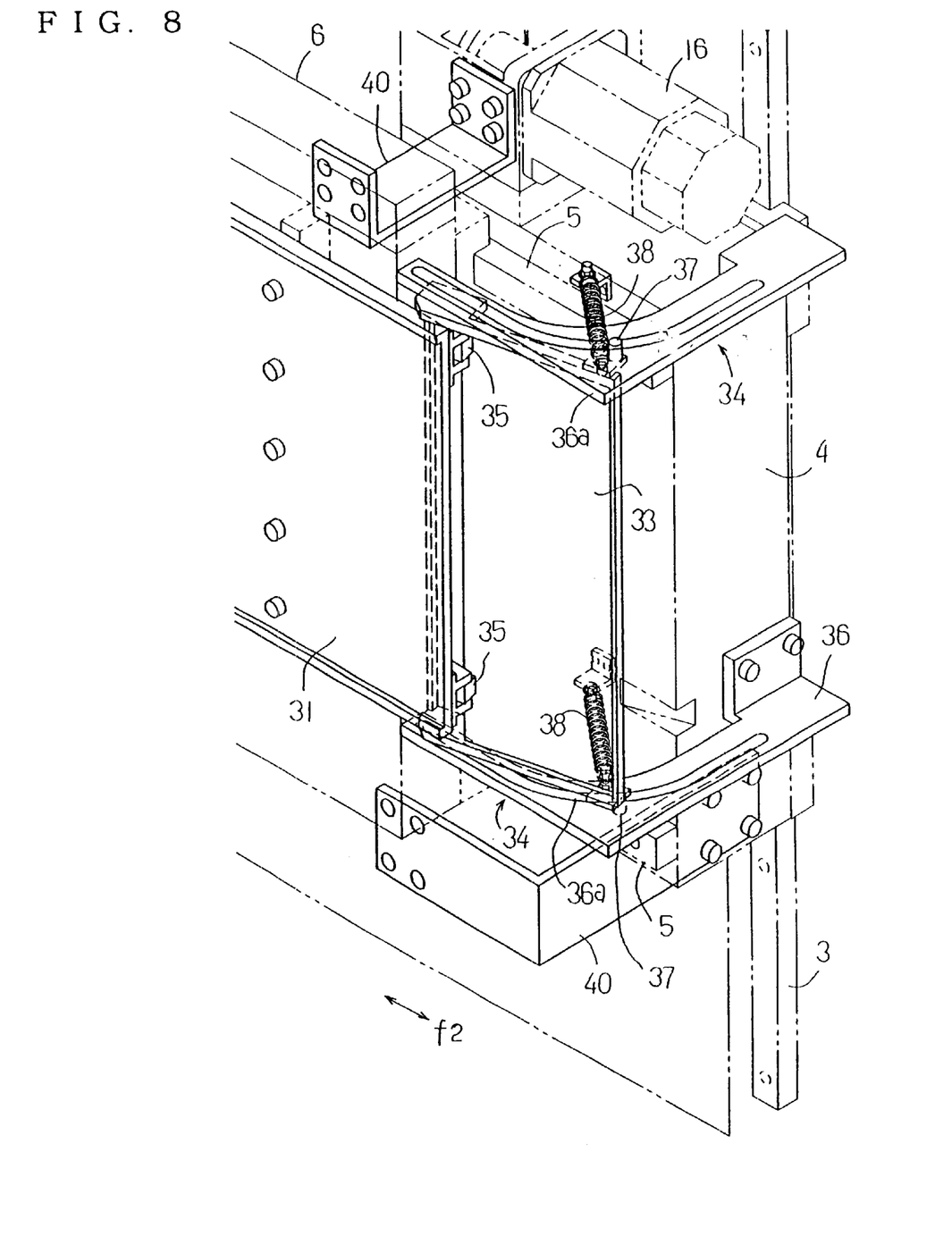
FIG. 8 is a perspective view showing a part of the above machine tool.

A side cover plate 33 is connected to each of right and left ends of the first cover plate 31 in such a manner that the side cover plate 33 can bend backwards due to guide means 34 provided between the first saddle 4 and the side cover plate 33. More specifically, as shown in FIG. 7 and FIG. 8, the side cover plate 33 is bendable in longitudinal direction by hinged joints 35 provided to each of the right and left ends of the first cover plate 31. The guide means 34 provided to each side cover plate 33 have guiding structures provided above and below the side cover plates 33. One of the structures is now described. A guide plate 36 in hooked from plane view is fixed to each end of the first saddle 4. A quartered circular guide passage 36a is provided to each guide plate 36. Roller 37 are protrudently provided to upper and lower ends of the side cover plate 33, and inserted into the guide passages 36a. Besides, springs 38 are provided as force means between points around the center of curvature of the guide passages 36a and around the pin bodies 37. The side cover plate 33 is pulled to the side that the springs 38 rock rearward by the force means.

Figure 9:
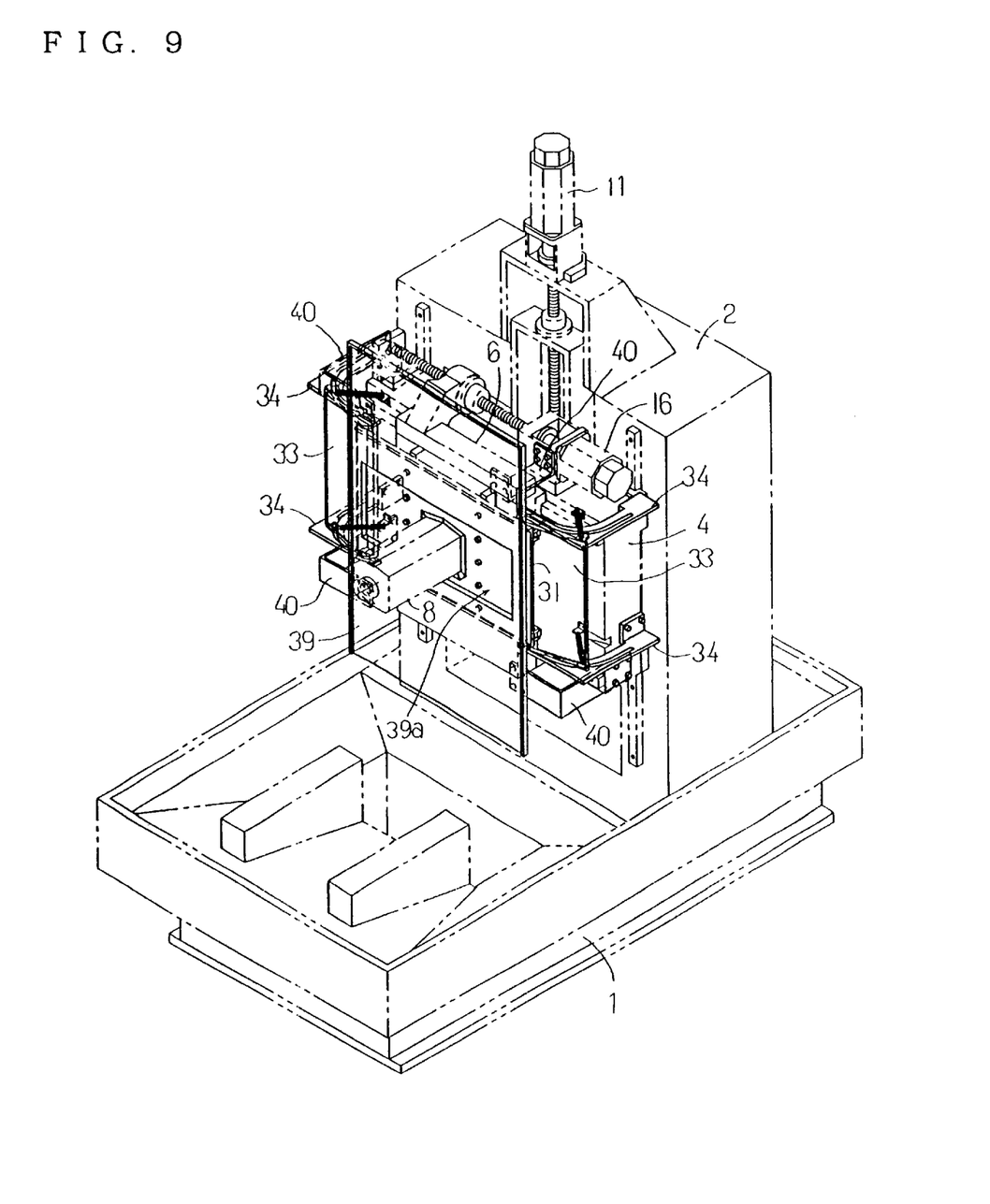
FIG. 9 is a perspective view of the above basic structure to which the second cover plate, the first cover-plate and the side cover plate are installed.

As shown in FIG. 9, the second cover plate 39 for covering the front, upper and lower sides of the first cover plate 31 is fixed integrally with the first saddle 4 through connecting members 40. The second cover plate 39 has a square through hole 39a through which the spindle head 8 can move in lateral direction.

Figure 10:
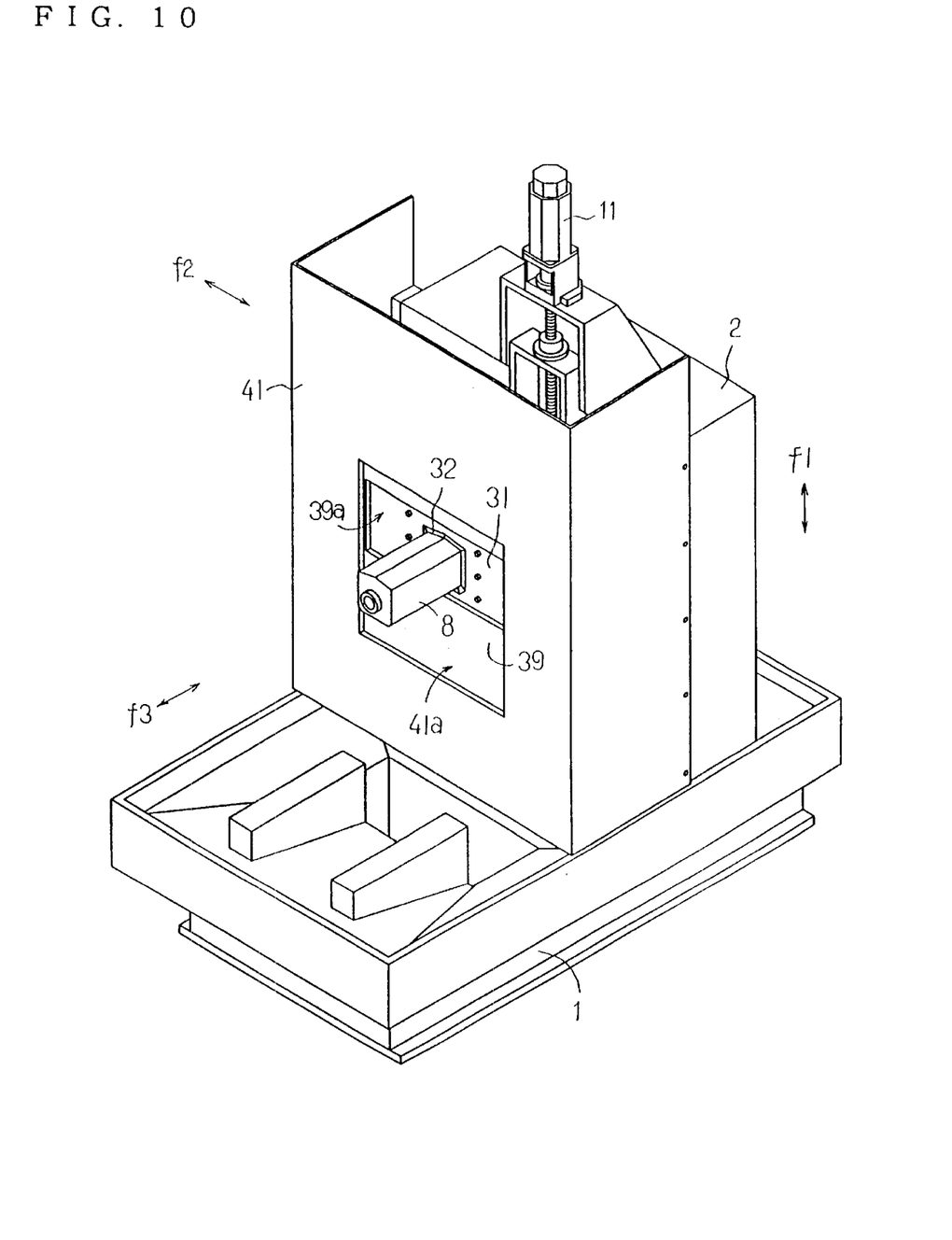
FIG. 10 is a perspective view of the above basic structure to which the third cover plate, the second cover plate, the side cover plate are installed.
Figure 11:
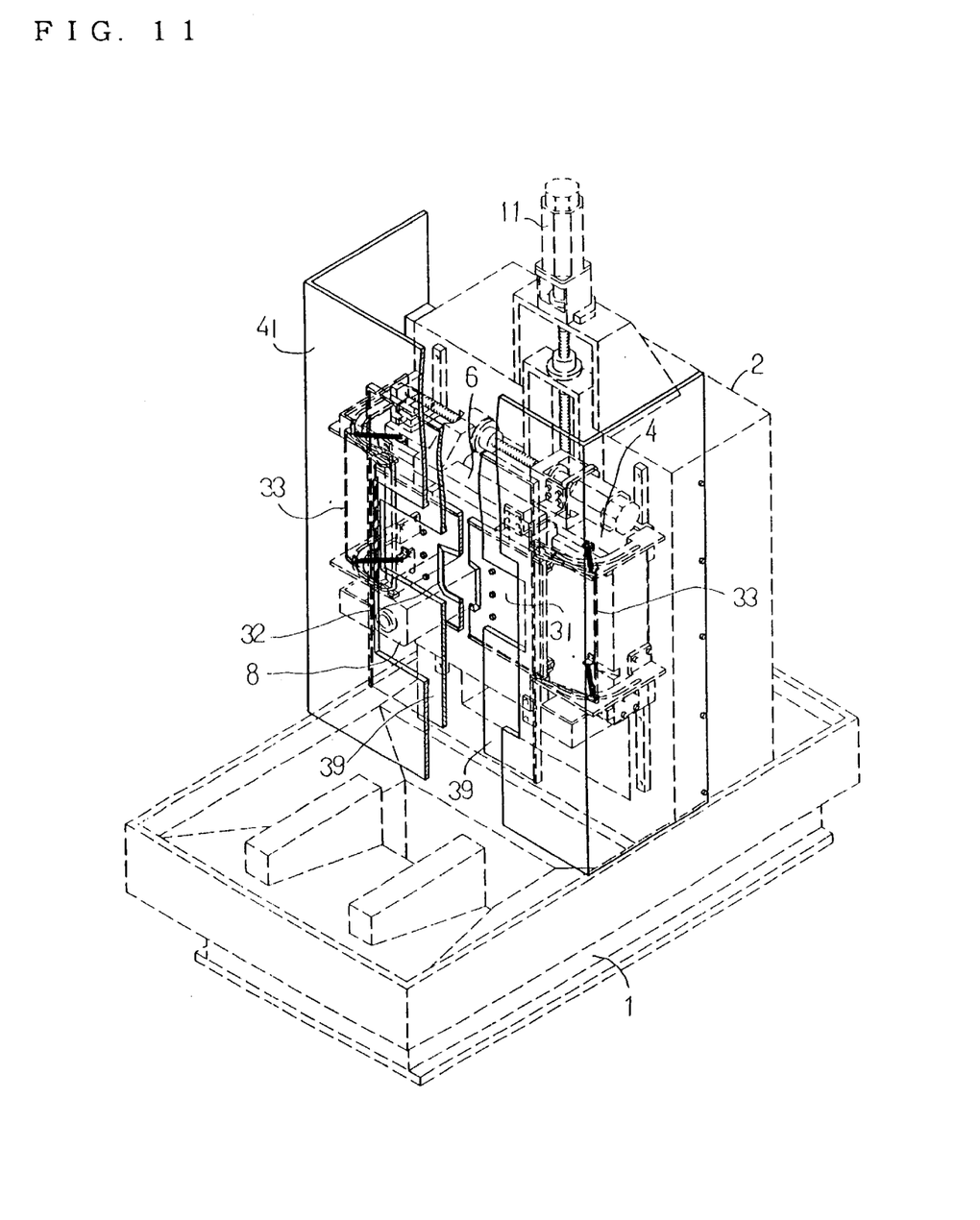
FIG. 11 shows the above machine tool whose first, second and third cover plates are dotted.

As shown in FIG. 10 and FIG. 11, the third cover plate 41 in U-shaped from plane view is fixed integrally with the column 2 on the front side of the second cover plate 39. end of the first saddle 4. A quartered circular guide passage 36a is provided to each guide plate 36. Roller 37 are protrudently provided to upper and lower ends of the side cover plate 33, and inserted into the guide passages 36a. Besides, springs 38 are provided as force means between points around the center of curvature of the guide passages 36a and around the pin bodies 37. The side cover plate 33 is pulled to the side that the springs 38 rock rearward by the force means.

As shown in FIG. 9, the second cover plate 39 for covering the front, upper and lower sides of the first cover plate 31 is fixed integrally with the first saddle 4 through connecting members 40. The second cover plate 39 has a square through hole 39a through which the spindle head 8 can move in lateral direction.

As shown in FIG. 10 and FIG. 11, the third cover plate 41 in U-shaped from plane view is fixed integrally with the column 2 on the front side of the second cover plate 39. In this case, the third cover plate 41 has a roughly square through hole 41a for allowing the spindle head 8 to move in vertical or lateral direction.

To form a machining center due to the basic structures of thus machine tool, the following not-illustrated structures are added. Those are, for example, a tool magazine for putting many tools therein, and an automatic tool exchange machine for tightly inserting a tool into the tip of the spindle 28 after receiving it from the tool magazine, or conversely returning the tool to the tool magazine after removing it from the tip end of the spindle 28, and a fence covering the whole structures above the bed 1 at need.

Next, an explanation follows about how to operate thus structured machine tool.

The first saddle 4 and the spindle head 8 move in vertical direction f1 by rotations of the servomotor 11. In this case, the first cover plate 31, the side cover plate 33 and the second cover plate 39 move in vertical direction integrally with the first saddle 4. The third cover plate 41 does not move in vertical direction because it is fixed on the column 2. However, a through hole 41 provided to the third cover plate 41 allows the spindle head 8 to move in vertical direction. During this vertical movement, the first cover plate 31 and the side cover plates 33 intercept a longitudinal space formed by a through hole 39a of the second cover plate 39. Besides, the second cover plate 39, the first cover plate 31 and the side cover plates 33 intercept a longitudinal space formed by the through hole 41a of the third cover plate 41.

The second saddle 6 and the spindle head 8 move in lateral direction f2 through rotations of the servomotor 16. In this case, the first cover plate 31 moves in lateral direction integrally with the second saddle 6. According to this lateral movement, the side cover plate 33 moves in lateral direction. Though the second cover plate 39 and the third cover plate 41 do not laterally move, the through holes 39a of the cover plate 39 and the through hole 41a of the cover plate 41 allow the spindle head 8 to move in lateral direction.

When each side cover plate 33 moves in lateral direction, the pin bodies 37 move, guided by the guide passages 36a of the guide plates 36. According to this movement, the side cover plate 33 moves in longitudinal direction around the hinged joints 35 due to force worked on the rollers 37.

Figure 12:
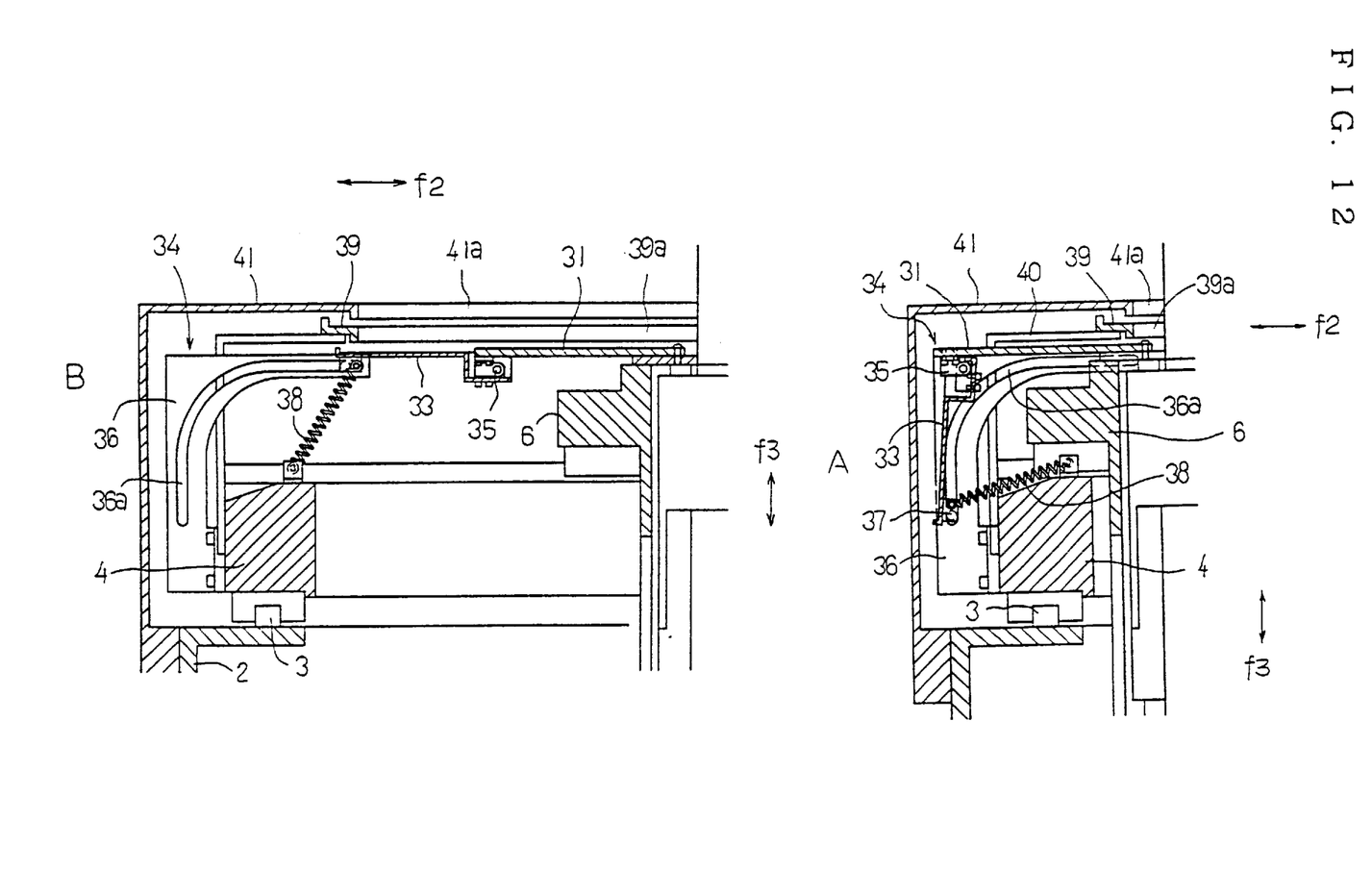
FIG. 12 shows a part of the above machine tool.

For example, when the second saddle 6 moves to the most right side, the side cover plate 33 on the right side moves backward at an almost right angle around the hinged joint 35 by an interaction between the guide passage 36a and the pin body 37 as shown in FIG. 12A. Conversely, when the second saddle 6 moves to the most left side, the side cover plate 33 on the left side is situated in the same lateral direction as the first cover plate 31 by an interaction between the guide passage 36a and the pin body 37 as shown in FIG. 12B. Then, the side cover plates 33 intercept a longitudinal space formed by the through hole 39a of the second cover plate 39. The side cover plate 33 on the left side works symmetrically to the side cover plate 33 on the right side. Hence, the longitudinal space formed by the through hole 39a of the second cover plate 39 is closed by the first cover plate 31 and the side cover plates 33, 33 regardless of locations of the second saddle 6 in lateral direction f2. Besides, a longitudinal space formed by the through hole 41a of the third cover plate 41 is closed by the second cover plate 39, the first cover plate 31 and the side cover plates 33, 33.

By rotations of the servomotor 27, the spindle head 8 moves in longitudinal direction f3. Accordingly, the spindle 28 moves to an optional position of the triaxial direction. In this case, while the spindle head 8 moves backward, the sealing means 32 prevents cutting chips and coolant adhered to the circumference of the spindle head 8 from intruding behind the first cover plate 31 by removing and dropping them.

According to the triaxial movements of the spindle 28 and rotations of the tool fitted on the tip of the spindle 28 by the drive motor, the workpiece fixed on the not-illustrated work table can be processed.

During processing of the workpiece, cutting chips and coolant generated by the tool splash backward due to rotations of the tool. Cutting chips having passed through the through hole 41a of the third cover plate 41 collide to the second cover plate 39 and fall. Cutting chips having passed through the through hole 39a of the second cover plate 39 collide to the first cover plate 31 and the side cover plates 33 and fall. Therefore, the cutting chips and the coolant do not directly fall on the first saddle 4 and the second saddle 6 regardless of the optional position of the spindle head 8 within its moving range. Besides, the cutting chips are certainly shut off by plate members of great rigidity.

While the second saddle 6 moves in lateral direction, each spring 38 pulls each pin body 37 of the side cover plates 33 toward the vicinity of the center of curvature on each guide passage 36a to press the side cover plates 33 on the circumference of the guide passage 36, thereby preventing backlash of the side cover plates 33 due to free space.

What is claimed is:

1. A machine tool, comprising a bed (1),
   a column (2) installed fixedly on the bed (1),
   a first saddle (4) guided on a front surface of the column (2) movably in a vertical direction,
   a second saddle (6) guided on a front surface of the first saddle (4) movably in a lateral direction with respect to the vertical direction,
   a spindle head (8) guided on the second saddle (6) movably in a longitudinal direction of the spindle head,
   wherein a first cover plate (31) is fixed to a front surface of the second saddle (6) in a manner so as to allow the longitudinal movement of the spindle head (8) therethrough,
   a side cover plate (33) is installed continuously connected with each of right and left side ends of the first cover plate (31) so as to turn backward in a guided manner during the lateral movement by a guiding effect of guiding means (34) for guiding provided between the side cover plates (33) and the first saddle (4),
   a second cover plate (39) is fixed integrally with the first saddle (4) to cover a front side of the first cover plate (31) and an upper side and a lower side of the first cover plate (31) in such a manner that the spindle head (8) can move in the lateral direction, and
   a third cover plate (41) is installed fixedly to a front side of the second cover plate (39) to cover the front surface of the column (2) in such a manner that the spindle head (8) can move in the vertical and lateral directions.

2. A machine tool as claimed in claim 1,
wherein the first cover plate (31) has a through hole (8*a*) into which the spindle head (8) is inserted movably in the longitudinal direction, and a sealing means (32) is provided between the through-hole (8*a*) and the spindle head (8) to hold their interval substantially liquid-tightly.

3. A machine tool as claimed in claim 1, wherein arcuate guide passages (36*a*) are provided to the guiding means (34).

4. A machine tool as claimed in claim 3,
wherein the second saddle (6) moves toward either one of right and left sides of the first saddle, and the side cover plate (33) on the side of the second saddle (6) toward which the second saddle moves turns backward around a part connected with the first cover plate (31) by a guiding effect of the arcuate guide passages (36*a*) on the guiding means (34).

5. A machine tool as claimed in claim 3, wherein each side cover plate (33) is pulled in a direction perpendicular to the arcuate guide passages (36*a*) on the guiding means (34) by forcing means (38).

* * * * *